(12) United States Patent
Proctor et al.

(10) Patent No.: US 6,505,765 B1
(45) Date of Patent: Jan. 14, 2003

(54) EXPANDABLE MOTORCYCLE SADDLEBAG WITH TOP COVER

(75) Inventors: Patrick N. Proctor, Iron Ridge, WI (US); Brian T. Nelson, Racine, WI (US); Louis N. Netz, Grafton, WI (US); Michael J. Jarosz, Pewaukee, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/619,375

(22) Filed: Jul. 19, 2000

(51) Int. Cl.$^7$ ................................. B62J 7/04; B62J 9/00
(52) U.S. Cl. ..................... 224/413; 224/430; 224/432; 224/439
(58) Field of Search .......................... 224/413, 417, 224/428–432, 436, 439, 441, 447, 450; 190/103, 104, 105

(56) References Cited

U.S. PATENT DOCUMENTS

| | | | |
|---|---|---|---|
| 3,443,671 A | * | 5/1969 | Dyke |
| 4,542,839 A | * | 9/1985 | Levine et al. |
| 4,597,599 A | | 7/1986 | Bisbing |
| 4,921,151 A | * | 5/1990 | Duvall |
| 5,324,115 A | * | 6/1994 | Weinreb |
| 5,810,230 A | * | 9/1998 | Nutto |

FOREIGN PATENT DOCUMENTS

| | | | | |
|---|---|---|---|---|
| CH | 242067 | * | 4/1946 | ................ 224/32 A |
| DE | 724639 | * | 7/1942 | ................ 224/32 A |
| FR | 1002897 | * | 3/1952 | ................ 224/209 |
| FR | 1557297 | * | 2/1969 | ................ 190/103 |
| GB | 23206 | * | 7/1912 | ................ 190/105 |
| GB | 2080220 A | * | 2/1982 | ................ 190/103 |

* cited by examiner

Primary Examiner—Nathan J. Newhouse
(74) Attorney, Agent, or Firm—Michael Best & Friedrich LLP

(57) ABSTRACT

An expandable saddlebag for a motorcycle that is adjustable between a contracted condition and an expanded condition. The expandable saddlebag includes a gusset, and a gusset closure mechanism that is moveable from a closed position to an open position to adjust the bag between the contracted and the expanded conditions, respectively. The expandable saddlebag also has a connecting device that allows for selectively opening and closing access to an interior cavity. The expandable saddlebag also includes a top cover selectively attachable to the expandable saddlebag in both the contracted and the expanded position. The expandable saddlebag also includes a saddlebag frame detachably secured to the frame of a motorcycle, and a handle to facilitate carrying the expandable saddlebag when it is detached from the motorcycle frame.

23 Claims, 8 Drawing Sheets

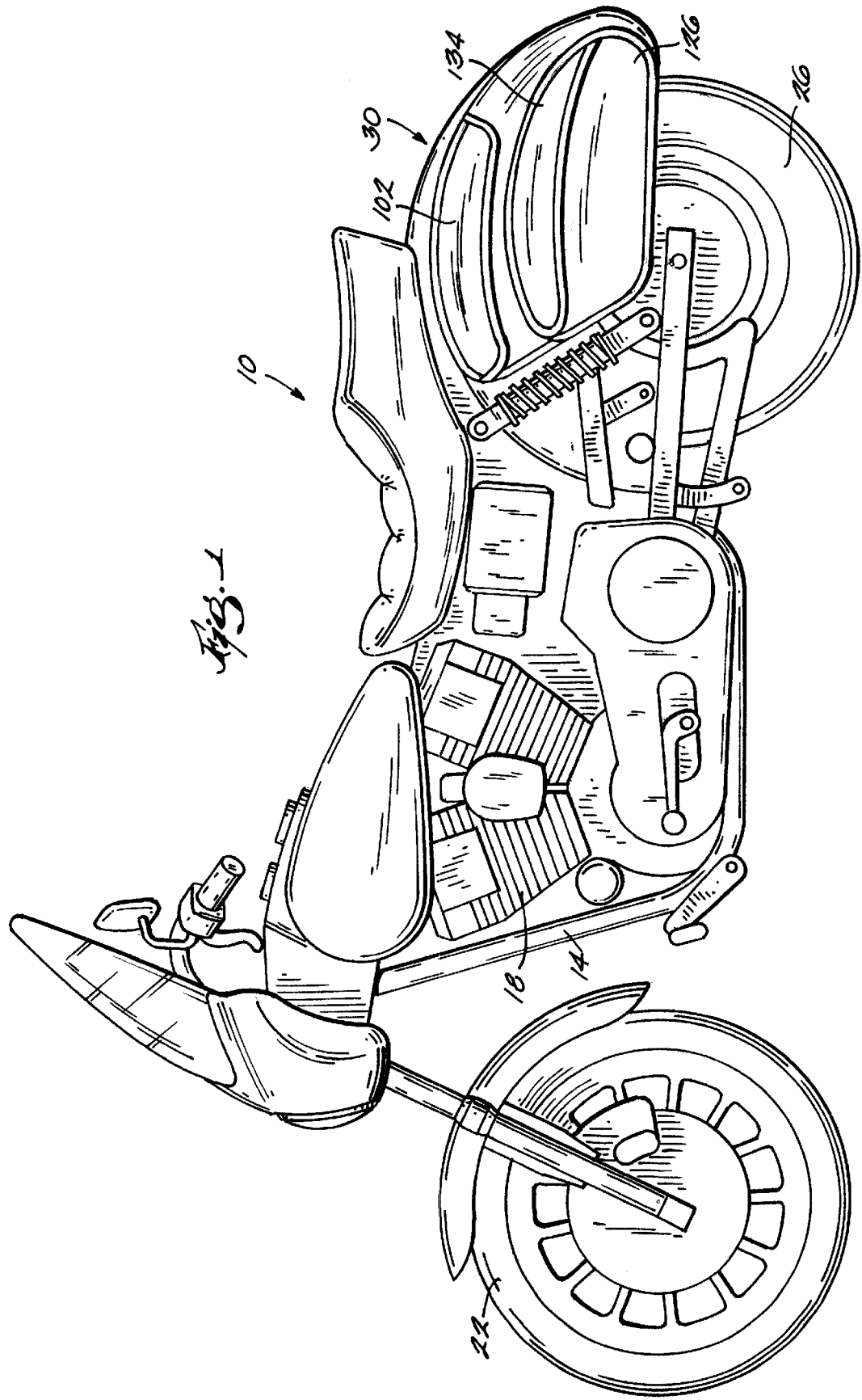

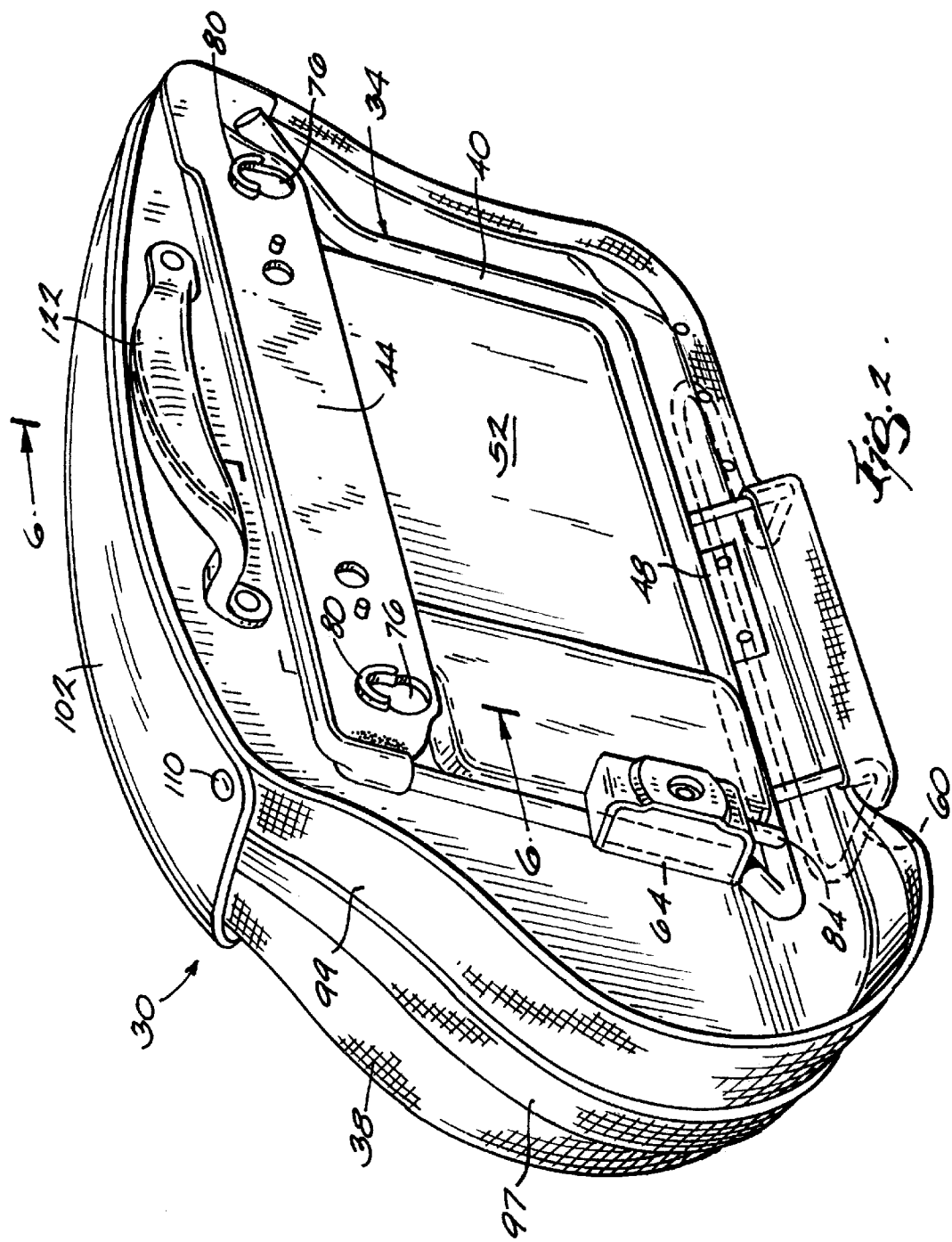

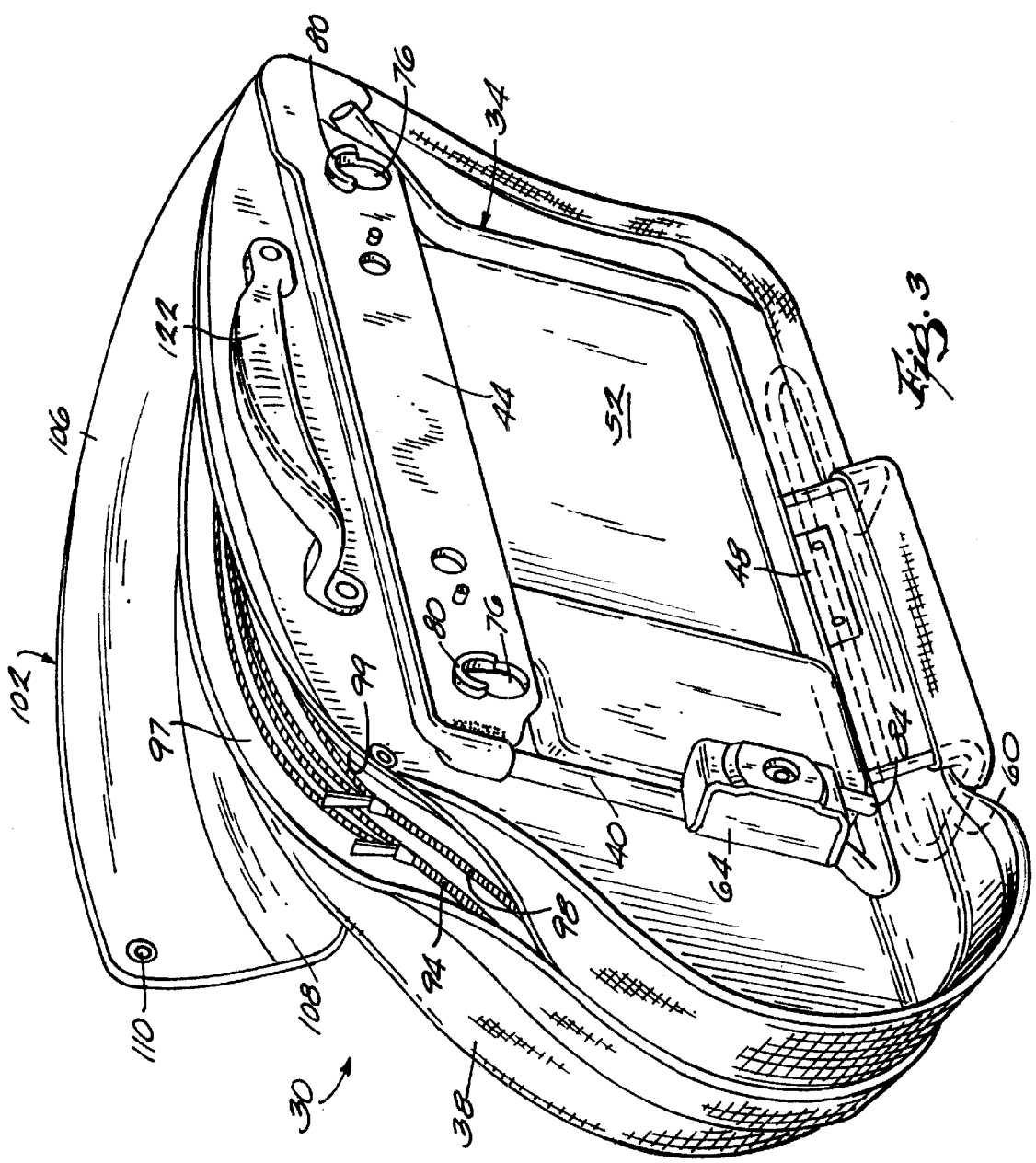

EXPANDABLE MOTORCYCLE SADDLEBAG WITH TOP COVER

FIELD OF THE INVENTION

The present invention relates to motorcycle saddlebags.

BACKGROUND OF THE INVENTION

It is known in the art to use saddlebags to store the belongings of motorcycle riders. Such saddlebags include leather saddlebags that provide a desired traditional ornamental appearance. The traditional styling for such leather saddlebags includes a flap that covers the opening to the bag. The flap is typically fastened shut with straps and buckles.

It is also known to provide a mounting system for securing the saddlebag to the motorcycle permitting removal of the bag from the motorcycle without the use of tools. Such mounting systems facilitate quick removal of the saddlebag in order to change the appearance of the motorcycle and/or to allow the use of the saddlebag for transporting items away from the motorcycle.

SUMMARY OF THE INVENTION

The present invention relates to an expandable saddlebag for motorcycles. The saddlebag preferably includes a mechanism for changing the interior volume of the expandable saddlebag by adjusting the bag between a contracted condition and an expanded condition. In the expanded condition, the interior cavity of the expandable saddlebag has a volumetric capacity greater than in the contracted condition. The expandable saddlebag includes a gusset and a gusset closure mechanism that is moveable from a closed position to an open position to selectively adjust the bag between the contracted and the expanded conditions. For example, when the gusset closure mechanism is in the closed position, the gusset is folded and hidden underneath the gusset closure mechanism and the bag is in the contracted condition. Alternatively, when the gusset closure mechanism is in the open position, the gusset is unfolded and exposed, and the bag is in the expanded condition. Also, the expandable saddlebag preferably has a bag closure mechanism that permits selectively opening and closing access to the interior cavity. The gusset closure mechanism and the bag closure mechanism are preferably zippers. The expandable saddlebag also preferably includes at least one lip to cover the gusset closure mechanism and the bag closure mechanism.

The expandable saddlebag includes a top cover to partially provide the gusset closure mechanism, the bag closure mechanism, and the saddlebag increased protection from the environment. The top cover has an inboard portion selectively attachable to the bag in both the contracted and the expanded conditions. For example, when the bag is in the contracted condition, the inboard portion of the top cover is selectively attachable to the bag, and the top cover covers both the gusset closure mechanism and the bag closure mechanism. Alternatively, when the bag is in the expanded condition, the inboard portion of the top cover is selectively attachable to the exposed gusset, and the top cover partially covers the exposed gusset but does not cover the bag closure mechanism.

The expandable saddlebag also includes a saddlebag frame. The saddlebag frame is preferably detachably secured to the fender support of a motorcycle. Preferably, the motorcycle frame includes at least one boss extending outwardly that is detachably connectable with an aperture located on the saddlebag frame. Preferably, the saddlebag frame is detachably mounted to the motorcycle frame by way of two apertures in the saddlebag frame mating with two bosses located on the motorcycle frame, and a latch device on the saddlebag mating with a latch pin on the motorcycle frame. The latch mechanism positively engages the latch pin by way of a spring bias, and the apertures receive the bosses under the influence of gravity. The expandable saddlebag also includes a handle to allow the operator to easily carry the expandable saddlebag when the expandable saddlebag is detached from the motorcycle frame.

More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

FIG. 1 is a side view of a motorcycle embodying the present invention;

FIG. 2 is a rear perspective view of the expandable saddlebag shown in FIG. 1 showing the expandable saddlebag in the contracted condition with the top cover closed;

FIG. 3 is a rear perspective view of the expandable saddlebag shown in FIG. 1 showing the expandable saddlebag in the contracted condition with the top cover open and the zippers exposed;

DETAILED DESCRIPTION OF PREFERRED EMBODIMENTS

Figure 8:
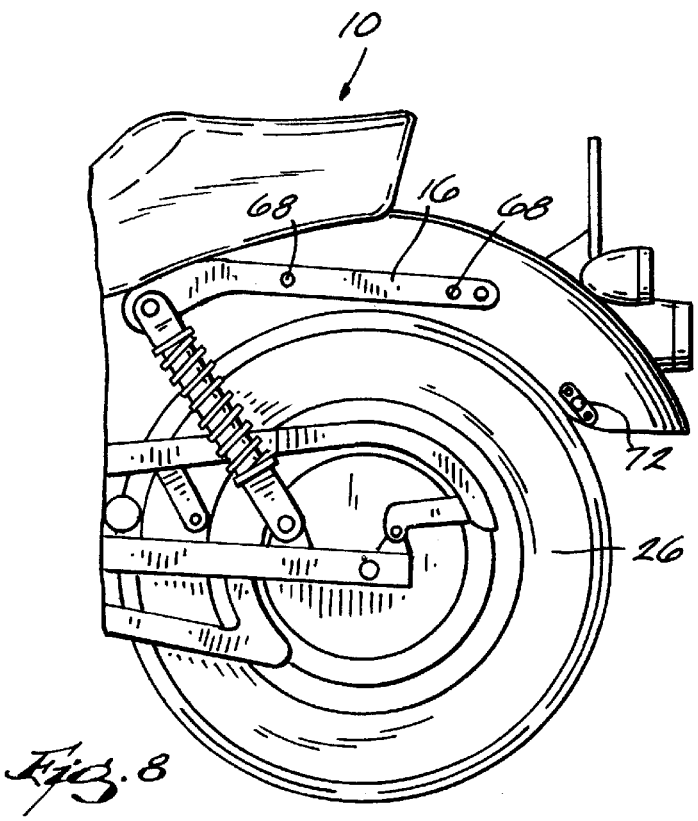
FIG. 8 is a side view of a portion of the motorcycle in FIG. 1 with the expandable saddlebag removed.

FIG. 1 illustrates a motorcycle 10 embodying the present invention. The motorcycle 10 includes a motorcycle frame 14 that includes a fender support 16 (FIG. 8), an engine 18 interconnected to the motorcycle frame 14, a front wheel 22 rotatably mounted to the motorcycle frame 14, and a rear wheel 26 driven by the engine 18 and rotatably mounted to the motorcycle frame 14. As illustrated in FIGS. 2–7, the motorcycle 10 also includes an expandable saddlebag 30 comprising a saddlebag frame 34 adapted to be mounted on the fender support 16, and a bag 38 connected to the saddlebag frame 34.

The saddlebag frame 34 secures the bag 38 to the fender support 16 and supports the bag 38 in a position away from the rear wheel 26 and other moving parts of the motorcycle 10. The saddlebag frame 34 includes a tube frame 40, a top bracket 44, and a lower mounting plate 48 interconnected to the tube frame 40. The tube frame 40 provides the overall support to the saddlebag frame 34. The lower mounting plate 48 and the top bracket 44 provide mounting surfaces for a support backing 52 of the bag 38. Preferably, the support backing 52 of the bag 38 is secured to the top bracket 44 and the lower mounting plate 48 using rivets or other suitable fasteners. The saddlebag frame 34 also includes a lower support 60 connected to the tube frame 40. The lower support 60 substantially prevents the bottom of the bag 38 from interfering with the motorcycle 10. The top bracket 44, the lower mounting plate 48, and the lower support 60 are preferably welded to the tube frame 40.

Referring to FIGS. 2, 3, 6, 8, and 11, the saddlebag frame 34 includes a latch device 64 that is interconnected (e.g., welded) to the tube frame 40. The latch device 64 is disclosed in U.S. Pat. No. 4,597,599 assigned to Southco, Inc. located in Concordville, Pa. The latch device 64 is manufactured by Southco as Part Number E2-0-34783-24. A pair of docking bosses 68 and a latch pin 72 extend outwardly from the fender support 16. The docking bosses 68 are designed to be releasably coupled to the saddlebag frame 34 through keyslots 76 located on the top bracket 44. The keyslots 76 are preferably fitted with nylon or other resilient bushings 80 to provide a substantially secure connection with the docking bosses 68. The bosses 68 are inserted into the lower, wide portion of the keyslots 76, and then moved or slid into the narrow portions of the keyslots 76 as the saddlebag 30 is lowered. The saddlebag 30 is thus held on the bosses 68 under the influence of gravity.

The latch pin 72 is adapted to be inserted into the latch device 64. A release rod 84 actuates the latch device 64, and is biased to positively engage the latch pin 72. The release rod 84 may be manually depressed into the latch device 64 to permit insertion or removal of the latch pin 72 with respect to the latch device 64. Once released from the latch device 64, the saddlebag 30 may be lifted from the docking bosses 68 to remove the expandable saddlebag 30 from the fender support 16. In this regard, the saddlebag 30 is mounted to the motorcycle 10 through positive engagement of the latch device 64 on the latch pin 72, and through the weight of the saddlebag 30 holding the docking bosses 68 within the keyslots 76.

The bag 38 includes an interior cavity 88 (FIGS. 6 and 7) that provides storage space on the motorcycle 10. The bag 38 and cavity 88 are adjustable between a contracted condition (FIGS. 2, 3, 6, and 10) and an expanded condition (FIGS. 4, 5, 7, and 9). The volume of the interior cavity 88 in the expanded condition is greater than the volume of the interior cavity 88 in contracted position.

Figure 5:
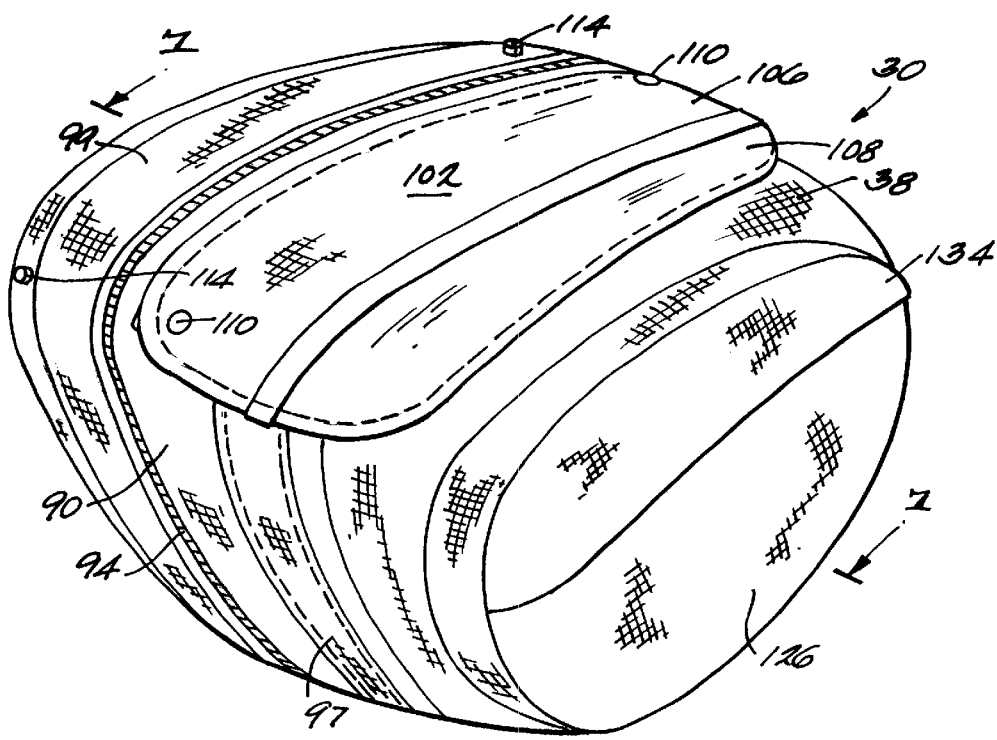
FIG. 5 is a front perspective view of the expandable saddlebag shown in FIG. 1 showing the expandable saddlebag in the expanded condition with the top cover closed.
Figure 4:
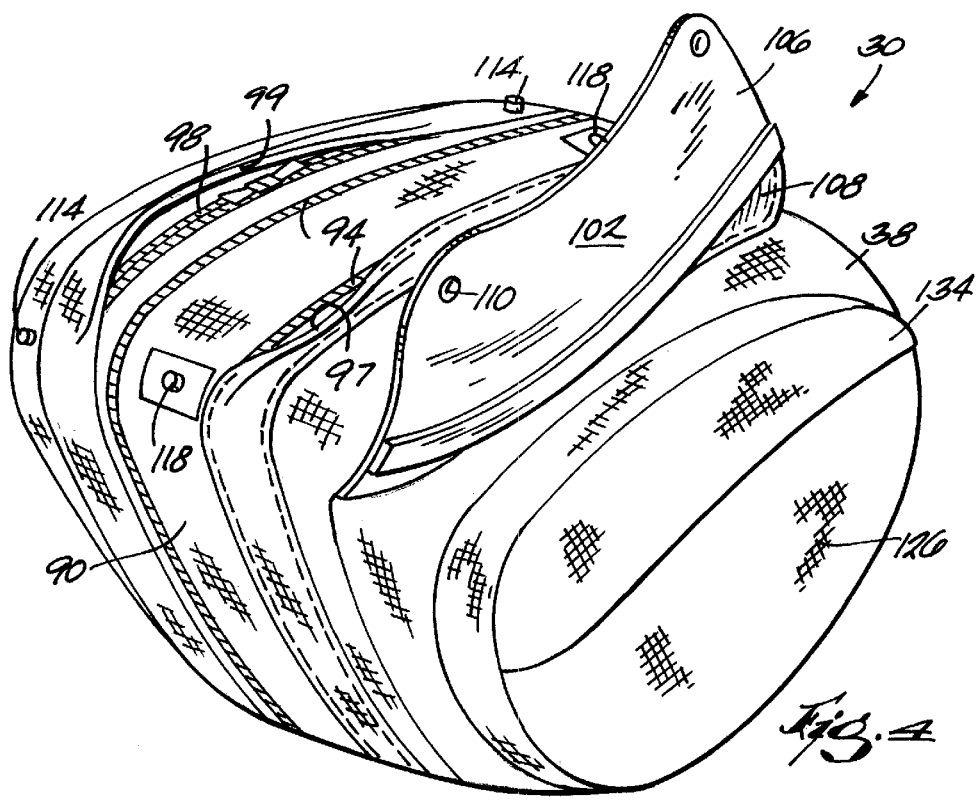
FIG. 4 is a front perspective view of the expandable saddlebag shown in FIG. 1 showing the expandable saddlebag in the expanded condition with the top cover open and the zippers exposed.
Figure 6:
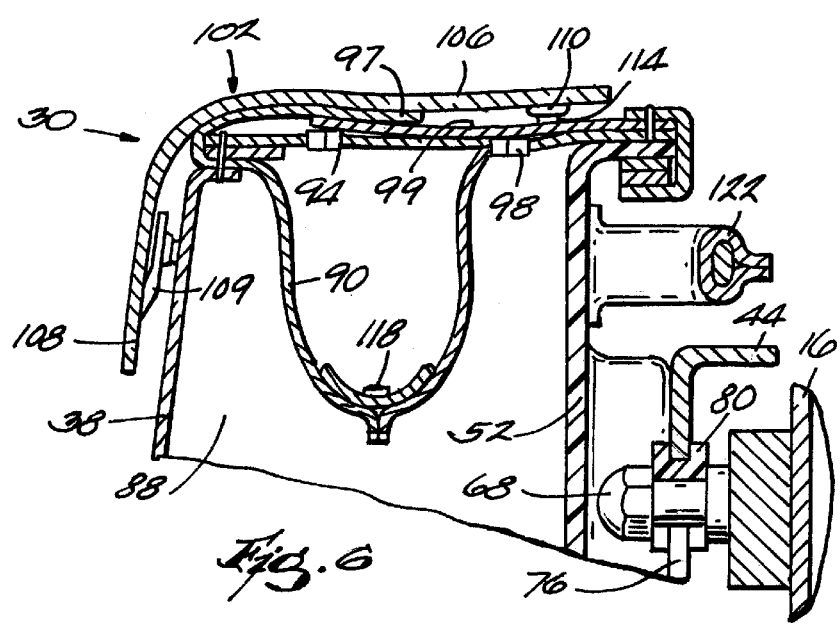
FIG. 6 is a cross-section view taken along line 6—6 in FIG. 2 and with the saddlebag mounted on the motorcycle.

To facilitate expansion, the bag 38 includes a gusset 90 and a gusset closure mechanism in the form of a zipper 94. As used herein, the term "gusset" means a flexible portion of the bag 38 that accommodates adjustment of the bag 38 between the contracted and expanded conditions. The illustrated gusset closure mechanism includes an elastic member 96 (FIG. 9) that connects the ends of the zipper 94. A gusset closure lip 97, which is preferably constructed of a flexible fabric or leather, covers and conceals the gusset closure mechanism when the gusset closure mechanism is closed, and partially covers it when it is open (see, for example, FIGS. 4 and 5). When the gusset closure mechanism is closed, the bag 38 is in the contracted condition, and the gusset 90 is folded and hidden underneath the gusset closure mechanism (FIG. 6). When the gusset closure mechanism is open, the bag 38 is in the expanded condition, and the gusset 90 is unfolded and exposed (FIGS. 4, 5, and 7).

Figure 9:
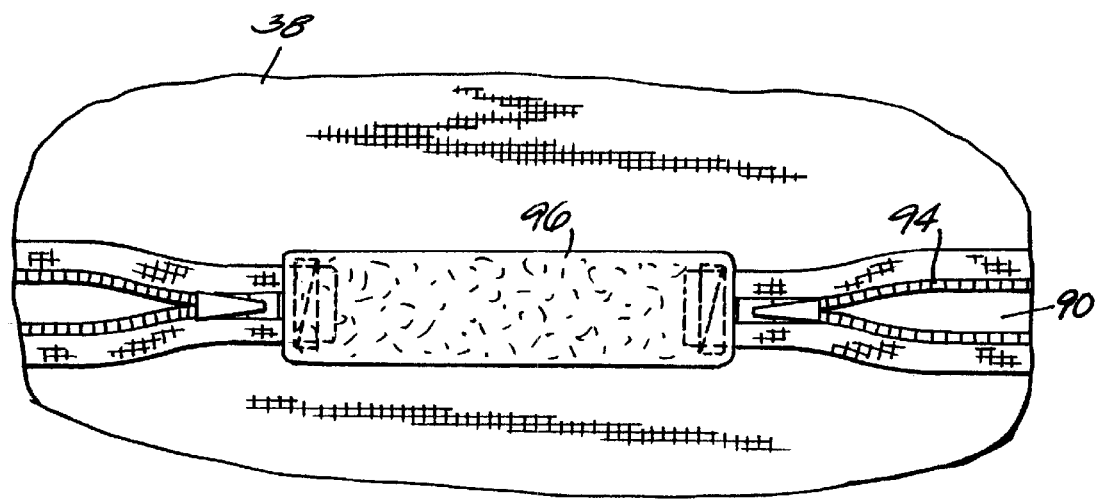
FIG. 9 is a view taken along line 9—9 in FIG. 7.

The bag 38 also includes a bag closure mechanism, which is preferably a zipper 98, for selectively opening and closing access to the interior cavity 88. A bag closure lip 99, which is preferably constructed of a flexible fabric or leather, covers and conceals the bag closure mechanism. Although the illustrated gusset closure mechanism and bag closure mechanism include zippers 94, 98, they may alternatively be hook and loop fasteners, such as Velcro®, snaps, buckles, straps, ties, or any other suitable closure device. The bag closure mechanism preferably does not extend around the entire perimeter of the bag 38, but only as much as is necessary to permit sufficient access to the cavity 88. As shown in FIG. 9, a portion of the gusset closure mechanism (the elastic member 96 and a portion of the zipper 94) is detached from the bag 38 to accommodate movement of the gusset closure mechanism during expansion of the bag 38. The elastic member 96 also facilitates opening and closing the gusset closure mechanism.

The support backing 52 of the bag 38 is preferably made from a high-density plastic and aids in preventing the interference of the bag 38 with the rear wheel 26 and other moving parts, and at least partially protects the bag 38 from debris thrown from the rear wheel 26. A flexible wall connects with the support backing 52 and provides the remaining walls of the bag 38. The flexible wall is preferably made from a flexible fabric material such as urethane-coated nylon or another suitable flexible material or leather that is preferably waterproof.

Figure 7:
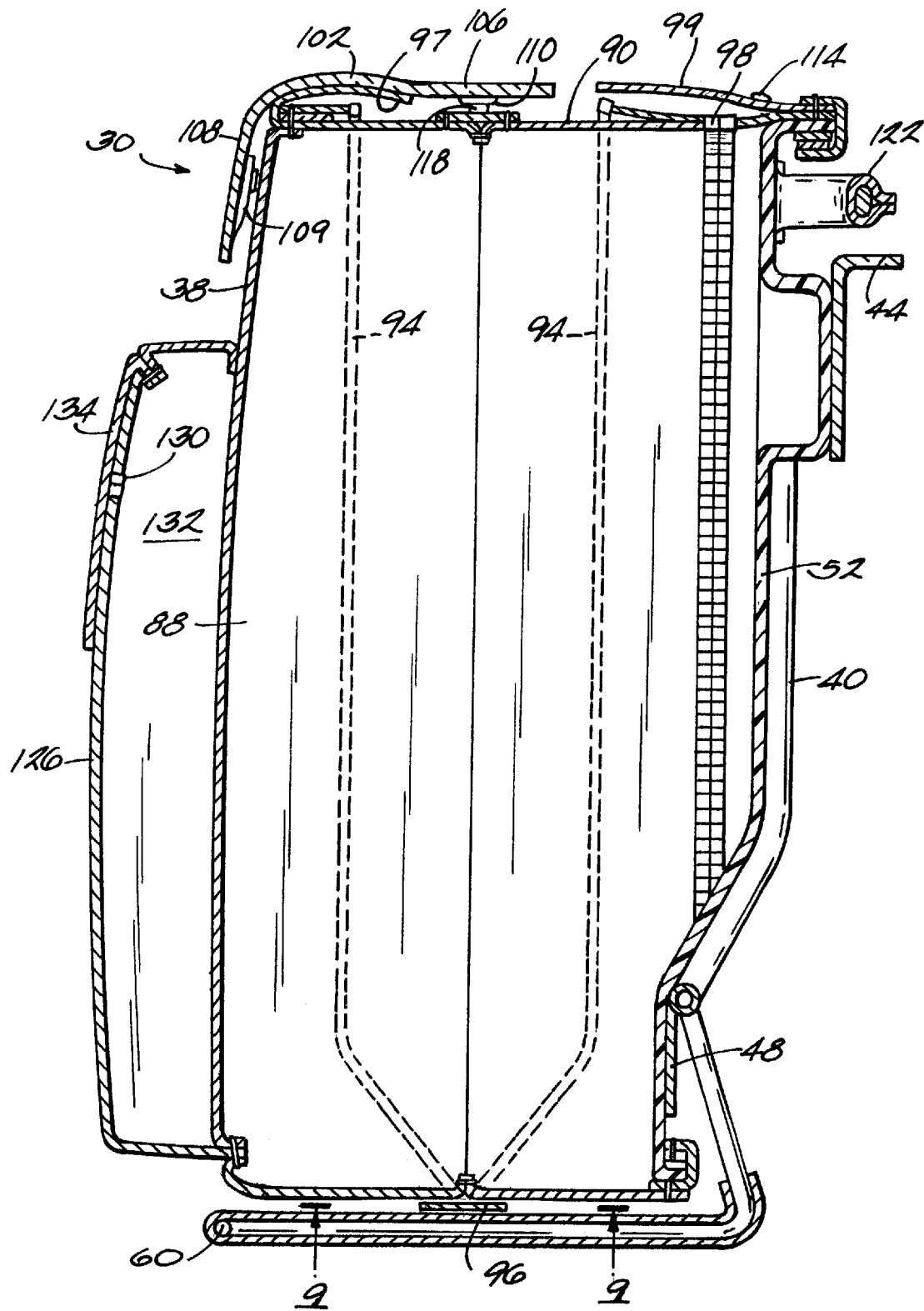
FIG. 7 is a cross-section view taken along line 7—7 in FIG. 5.
Figure 10:
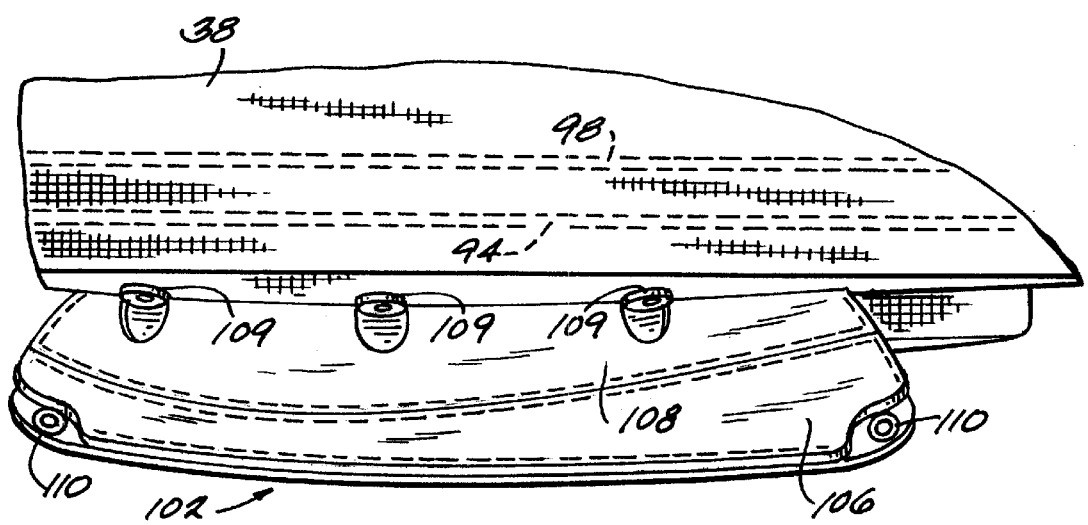
FIG. 10 is a top view of a portion of the expandable saddlebag shown in FIG. 1 showing the top cover open.
Figure 11:
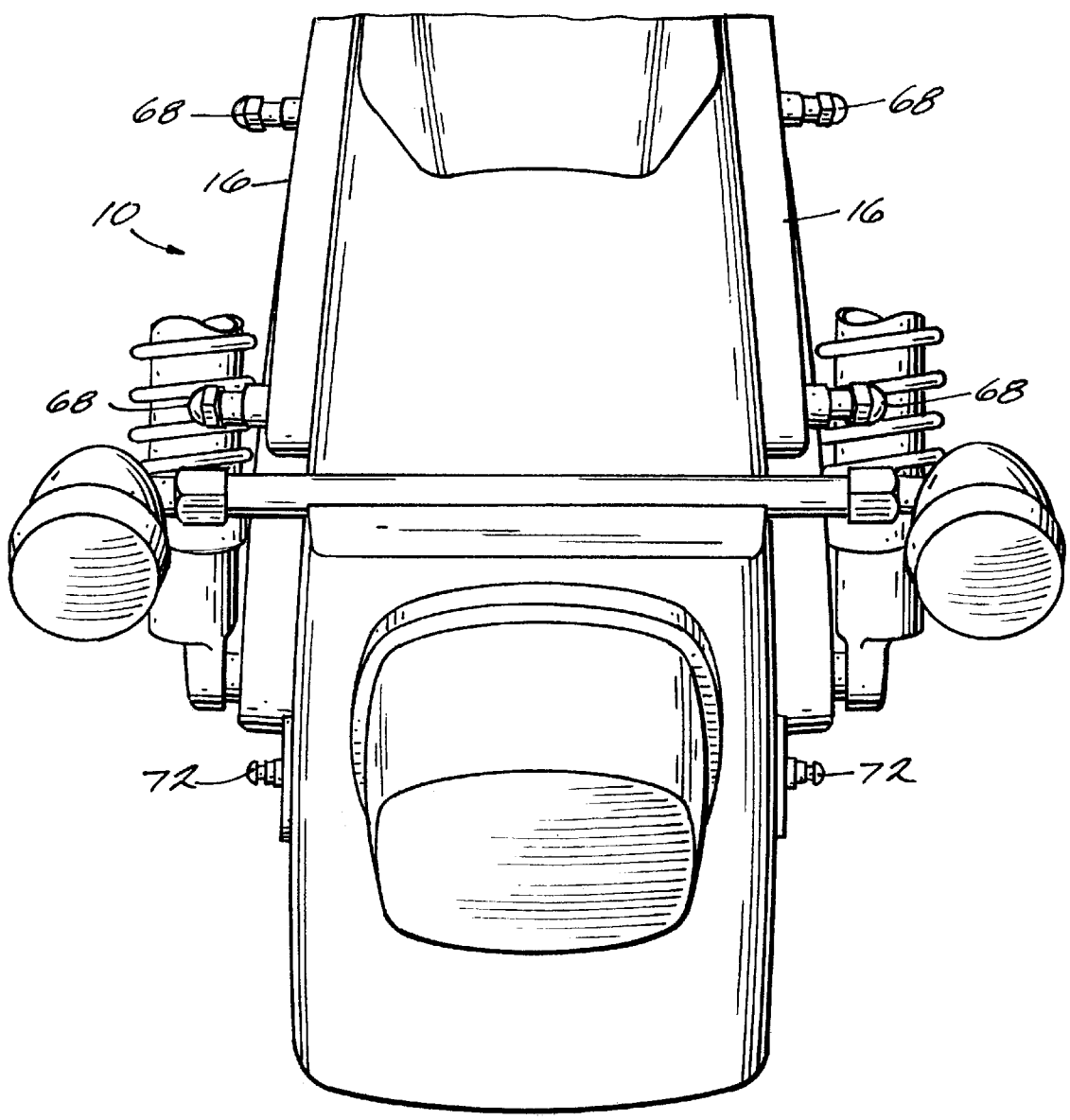
FIG. 11 is a rear perspective view of a portion of the motorcycle of FIG. 1.

With reference to FIG. 7, the expandable saddlebag 30 includes a top cover 102 having an inboard portion 106 that can be attached to the bag 38 and an outboard portion 108 connected to the outboard side of the bag 38. The top cover 102 helps protect the bag 38 from the environment and preserves the traditional look of the saddlebag 30. The top cover is preferably constructed of two layers of leather, an upper layer and a lower layer. As shown in FIG. 10, the outboard side 108 is preferably connected to the outboard side of the bag 38 via three rivets mounted through three leather tabs 109 cut from the lower layer of top cover 102 to create a living hinge. The upper layer of the top cover 102 covers the cut out portions that form the tabs 109. The inboard portion 106 carries connectors 110. When the bag 38 is in the contracted condition, the connectors 110 can be attached to a set of first mating connectors 114 located on the bag closure lip 99. When the bag 38 is in the expanded condition, the connectors 110 can be attached to a set of second mating connectors 118 located on the exposed gusset 90. Preferably, the connectors 110, 114, 118 are snaps.

The saddlebag 30 further includes a handle 122 connected to the support backing 52 of the bag 38. The handle 122 facilitates carrying the saddlebag 30 when the saddlebag 30 is disconnected from the fender support 16. Preferably, the handle 122 is made from fabric, leather, or another flexible material and is riveted to the support backing 52.

As seen in FIG. 7, the saddlebag 30 also includes an outer pouch 126 located on the outboard face of the bag 38. The outer pouch 126 includes an outer closure device 130 (e.g., a zipper) and a cavity 132. The outer closure device 130 is moveable between an open and a closed position to selectively provide access to the cavity 132. The outer pouch 126 also includes a lip cover 134 extending over the outer closure device 130. Although the cavity 132 of the outer pouch 126 does not expand, the outer pouch 126 is carried by the outer wall of the saddlebag 30 and will thus move away from the motorcycle 10 as the bag 38 is expanded.

Although the illustrated expandable saddlebag 30 provides a bag 38 adjustable between an expanded condition and a contracted condition, the expandable saddlebag 30 maintains the look of a traditional saddlebag. Specifically, the top cover 102 is preferably made of leather and not only partially covers the gusset closure mechanism and bag closure mechanism, but also provides the expandable saddlebag 30 with a traditional ornamental appearance. The gusset and bag closure lips 97, 99 further conceal the closure mechanisms to add to the aesthetics of the saddlebag 30. Also, because the outboard portion 108 is permanently affixed to the outboard side of the saddlebag 30, the top cover 102 provides the aesthetic appearance of the traditional flap closure when viewed from the side (e.g., FIG. 1) whether the bag 38 is in the expanded or contracted condition.

The embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An expandable motorcycle saddlebag comprising:
a bag defining an interior cavity and including a gusset that facilitates adjustment of the bag between a contracted condition and an expanded condition, said interior cavity having a first volume when said bag is in said contracted condition and a second volume greater than the first volume when said bag is in said expanded condition;
a bag closure mechanism for selectively permitting and restricting access to said interior cavity;
a gusset closure mechanism for holding said bag in said contracted condition;
a top cover coupled to said bag and covering an upper portion of at least one of said bag closure mechanism and said gusset closure mechanism;
a first releasable fastener mounted on a wall of said bag; and
a second releasable fastener mounted on said gusset,
wherein said top cover has a first portion coupled to said bag and a second portion releasably coupled to said bag, and wherein said second portion of said top cover is attachable to said first releasable fastener when said bag is in said contracted condition and to said second releasable fastener when said bag in said expanded condition.

2. The saddlebag of claim 1, wherein said gusset closure mechanism includes a zipper.

3. The saddlebag of claim 1, wherein said bag closure mechanism includes a zipper.

4. The saddlebag of claim 1, wherein said bag further includes a fabric lip covering at least one of said bag closure mechanism and said gusset closure mechanism.

5. The saddlebag of claim 1, further comprising a handle interconnected to said bag.

6. A motorcycle comprising:
a motorcycle frame;
an expandable motorcycle saddlebag including:
a saddlebag frame detachably connectable to said motorcycle frame,
a bag defining an interior cavity and including a gusset that facilitates adjustment of the bag between a contracted condition and an expanded condition, said interior cavity having a first volume when said bag is in said contracted condition and a second volume greater than the first volume when said bag is in said expanded condition,
a bag closure mechanism for selectively permitting and restricting access to said interior cavity, and
a gusset closure mechanism for holding said bag in said contracted condition;
a top cover coupled to said bag and covering an upper portion of at least one of said bag closure mechanism and said gusset closure mechanism;
a first releasable fastener mounted on a wall of said bag; and
a second releasable fastener mounted on said gusset,
wherein said top cover has a first portion coupled to said bag and a second portion releasably coupled to said bag, and wherein said second portion of said top cover is attachable to said first releasable fastener when said bag is in said contracted condition and to said second releasable fastener when said bag in said expanded condition.

7. The motorcycle of claim 6, wherein said gusset closure mechanism includes a zipper.

8. The motorcycle of claim 6, wherein said bag closure mechanism includes a zipper.

9. The motorcycle of claim 6, wherein said bag further includes a fabric lip covering at least one of said bag closure mechanism and said gusset closure mechanism.

10. The motorcycle of claim 6, further comprising a handle interconnected to said bag.

11. The motorcycle of claim 6, wherein said motorcycle frame includes a latch pin and wherein said saddlebag frame includes a latch mechanism positively engageable with said latch pin.

12. The motorcycle of claim 6, wherein said motorcycle frame includes two bosses and a latch pin, and wherein said saddlebag frame includes two keyslots and a latch device, said keyslots receiving said bosses and holding said bosses in said keyslots under the influence of gravity, said latch device positively engaging said latch pin.

13. The motorcycle of claim 6, wherein said motorcycle frame includes at least one boss, wherein said saddlebag frame includes at least one aperture detachably connectable with said boss.

14. The motorcycle of claim 13, wherein said aperture is a keyslot.

15. An expandable motorcycle saddlebag comprising:
a bag including a fixed portion that is securable to a motorcycle, said bag defining an interior cavity and including a gusset that facilitates adjustment of the bag between a contracted condition and an expanded condition, said interior cavity having a first volume when said bag is in said contracted condition and a second volume greater than the first volume when said bag is in said expanded condition, said bag including a movable portion movable with respect to said fixed portion and coupled to said gusset, said movable portion including an upper edge;

a mounting structure fastened to said fixed portion of said bag, said mounting structure adapted to releasably secure said bag to the motorcycle;

a bag closure mechanism for selectively permitting and restricting access to said interior cavity;

a gusset closure mechanism for holding said bag in said contracted condition; and a cover overlying substantially all of said upper edge and at least partially covering one of said gusset closure mechanism and said bag closure mechanism, said cover having a first end affixed to said movable portion and a second end securable to a first fastening location on said bag in said contracted condition and securable to a different second fastening location on said bag in said expanded condition;

wherein said cover maintains its position with respect to said upper edge and provides a substantially similar aesthetic appearance as said bag is adjusted between said expanded and said retracted conditions.

16. The saddlebag of claim 15, wherein said gusset closure mechanism includes a zipper.

17. The saddlebag of claim 15, wherein said bag closure mechanism includes a zipper.

18. The saddlebag of claim 15, wherein said bag further includes a fabric lip covering at least one of said bag closure mechanism and said gusset closure mechanism.

19. The saddlebag of claim 15, further comprising a handle interconnected to said bag.

20. The saddlebag of claim 15, wherein said cover is securable to said fixed portion when said bag is in said contracted condition, and to said gusset when said bag is in said expanded condition.

21. The saddlebag of claim 15, wherein a portion of said cover extends a distance below said edge, and wherein said distance remains the same as said bag is adjusted between said expanded condition and said contracted condition.

22. The saddlebag of claim 15, wherein said fixed portion includes a support backing providing structural rigidity to said fixed portion, wherein said mounting structure is fastened directly to said support backing.

23. An expandable motorcycle saddlebag comprising:

a bag including a fixed portion that is securable to a motorcycle, said bag defining an interior cavity and including a gusset that facilitates adjustment of the bag between a contracted condition and an expanded condition, said interior cavity having a first volume when said bag is in said contracted condition and a second volume greater than the first volume when said bag is in said expanded condition, said bag including a movable portion movable with respect to said fixed portion and coupled to said gusset, said movable portion including an upper edge;

a bag closure mechanism for selectively permitting and restricting access to said interior cavity;

a gusset closure mechanism for holding said bag in said contracted condition; and a cover affixed to said movable portion and overlying substantially all of said upper edge, said cover at least partially covering one of said gusset closure mechanism and said bag closure mechanism;

wherein said cover maintains its position with respect to said upper edge and provides a substantially similar aesthetic appearance as said bag is adjusted between said expanded and said retracted conditions, and wherein said cover is securable to said fixed portion when said bag is in said contracted condition, and to said gusset when said bag is in said expanded condition.

\* \* \* \* \*